United States Patent [19]

Hogan et al.

[11] 4,093,996

[45] June 6, 1978

[54] CURSOR FOR AN ON-THE-FLY DIGITAL TELEVISION DISPLAY HAVING AN INTERMEDIATE BUFFER AND A REFRESH BUFFER

[75] Inventors: Walter John Hogan, Fairfax, Va.; Alfred Alexander Schwartz, Leander, Tex.; Joseph Robert Stewart, Lexington, Ky.

[73] Assignee: International Business Machines Corporation, Armonk, N.Y.

[21] Appl. No.: 679,543

[22] Filed: Apr. 23, 1976

[51] Int. Cl.² .................. G06F 3/14; G06K 15/20
[52] U.S. Cl. .................. 364/900; 340/324 A
[58] Field of Search ........ 340/172.5, 324 A, 324 AD; 445/1; 178/6, 6.8, 7.7, 18; 250/549; 315/18, 149, 367; 364/200 MS File, 900 MS File

[56] References Cited

U.S. PATENT DOCUMENTS

| | | | |
|---|---|---|---|
| 3,505,666 | 4/1970 | Thorpe | 340/324 A |
| 3,506,875 | 4/1970 | Watanabe et al. | 340/324 A X |
| 3,509,350 | 4/1970 | Gundrum | 340/324 A X |
| 3,651,508 | 3/1972 | Scarborough, Jr. et al. | 340/324 A |
| 3,832,693 | 8/1974 | Ishizaki et al. | 340/172.5 |
| 3,852,721 | 12/1974 | Tucker et al. | 340/172.5 |
| 3,891,890 | 6/1975 | Yasuda et al. | 340/324 A X |
| 3,944,988 | 3/1976 | Mayer | 340/172.5 |
| 3,973,245 | 8/1976 | Belser | 340/172.5 |
| 3,996,582 | 12/1976 | Sinobad | 340/324 A |
| 3,997,891 | 12/1976 | Iwamura et al. | 340/324 AD |
| 4,011,546 | 3/1977 | Kawata et al. | 364/200 |

*Primary Examiner*—Melvin B. Chapnick
*Attorney, Agent, or Firm*—John E. Hoel

[57] ABSTRACT

A cursor circuit for an on-the-fly digital television display system. The host digital television display system employs an intermediate buffer which stores a coded representation of the symbol only during the period of its display. In order to obtain access of the encoded symbol in storage with a conventional light pen, the circuit secures the identity of the encoded symbol in the intermediate buffer during the first display frame. This identity is the address of the symbol as stored in a refresh buffer. This identity is made available for accessing the refresh buffer during a second display frame. This enables convenient access of the encoded symbol in an on-the-fly digital television display.

6 Claims, 2 Drawing Figures

VIDEO GENERATOR CIRCUIT

CURSOR FOR AN ON-THE-FLY DIGITAL TELEVISION DISPLAY HAVING AN INTERMEDIATE BUFFER AND A REFRESH BUFFER

FIELD OF THE INVENTION

The invention disclosed herein relates to digital television display systems and more particularly to apparatus for accessing encoded display data in an on-the-fly digital television display.

BACKGROUND OF THE INVENTION

The cursor circuit invention disclosed herein is employed as a subsystem in the video generator circuit for a dynamic digital television display disclosed in U.S. Pat. No. 3,996,585, assigned to the instant assignee, which is a continuation-in-part of Ser. No. 478,816, by W. J. Hogan and A. A. Schwartz, filed June 11, 1974 now abandoned. This video generator circuit system converts randomly occuring data signals representing graphical patterns into a time sequential video signal for use with a sequentially line scanned display device. The circuit is comprised of a threaded refresh buffer connected to receive the data signals and adapted to sort the data signals into groups ordered by extremal line scan positions for the pattern represented. An intermediate buffer has a first input connected to the output of the threaded refresh buffer for storing the ordered data signals once during each display field for the display of the pattern represented and outputting the ordered data signals in synchronism with the line scans of the display. The graphical pattern generator is connected to the output of the intermediate buffer for decoding the ordered data signals outputted therefrom and generating on a first output line components of the pattern represented which lie along the display line to be scanned. A partial raster assembly storage is connected to the first output line from the graphical pattern generator, to store the components of the pattern represented which lie along the display line to be scanned. The graphical pattern generator modifies the decoded ordered data signals to identify the horizontal coordinate for the intersection of the pattern represented with the next display line to be scanned, and outputs the modified data signal over a second output line to a second input line for storage in the intermediate buffer. The graphical pattern generator omits the output of a modified data signal on the second output line when no components of the pattern will intersect succeeding display lines to be scanned in the field.

Directed beam displays, such as the IBM 2250, permit operator designation of data in the refresh buffer without burdening the host processor. This is possible since the data is stored in the refresh buffer in the location designated by the host processor and in the same coded format as received. Since all of one graphic entity is completely displayed before the next is read from the refresh buffer, a light pen detect can uniquely identify a particular item. Conventional graphic digital television (DTV) with its bit per picture element refresh buffer, has lacked this capability.

The on-the-fly digital television display system disclosed in the above referenced Hogan, et al. application, is more amenable to operator designation of data than other known graphic digital television systems, including both bit per element and on-the-fly systems. The invention disclosed herein provides a means for implementing the operator designation function in that system.

OBJECTS OF THE INVENTION

It is an object of the invention to access display data from storage, in an improved manner.

It is still another object of the invention to access display data in an on-the-fly digital television display system.

It is still a further object of the invention to access display data in a more efficient manner than has been available in the prior art.

SUMMARY OF THE INVENTION

These and other objects, features and advantages of the invention are accomplished by the cursor circuit for an on-the-fly digital television display system, disclosed herein. The circuit is employed in a coded digital TV system containing an ordered refresh buffer connected to receive randomly occuring data signals and sort those signals into groups ordered by extremal line scan position. The DTV host system includes an intermediate buffer having a first input connected to the output of the refresh buffer for storing the ordered data signals once during each display field and outputting the ordered data signals in synchronism with the line scan of the display. A display element generator is included in the host system which is connected to the output of the intermediate buffer for decoding the ordered data signals output from the intermediate buffer and generating on a first output line components of a display element which lie along the display line to be scanned. Included in the host DTV system is a partial raster assembly storage connected to the first output line from the display element generator to store the components of the display element which lie along the display line to be scanned. Also included in the DTV host system is a display means connecting the output of the partial raster assembly storage for displaying the encoded elements. The cursor improvement in the host digital television display system is comprised of a light pen means for generating a signal when positioned at a selected point on the display containing an illuminated coded element to be accessed, during a first display frame interval. Also included in the cursor circuit is a coordinate storage means having an input connectd to the display element generator and an input connected to the light pen means, for storing the "X" and "Y" coordinates of the coded element upon receipt of the light pen signal. Also included in the cursor circuit is a means for comparing the X coordinate of each coded element with the X coordinate value stored in the coordinate storage means during the loading of the video data in the partial raster assembly storage for the raster line having a Y coordinate equal to the values stored in the coordinate storage means, so as to identify the coded element to be accessed in the intermediate buffer. The circuit operates to identify the coded element to be accessed from the intermediate buffer. The coded elements are represented by a code containing address bits of the coded element in the refresh buffer. Included in the cursor circuit is a means for outputting the address bits to a utilization device such as the computer to which the display is attached, to enable access of the coded element from the refresh buffer.

DESCRIPTION OF THE FIGURES

The foregoing and other objects, features and advantages of the invention will be apparent from the following more particular description of the preferred embodiment of the invention, as illustrated in the accompanying drawings.

DISCUSSION OF THE PREFERRED EMBODIMENT

Video Generator System Context for the Cursor

Figure 1:
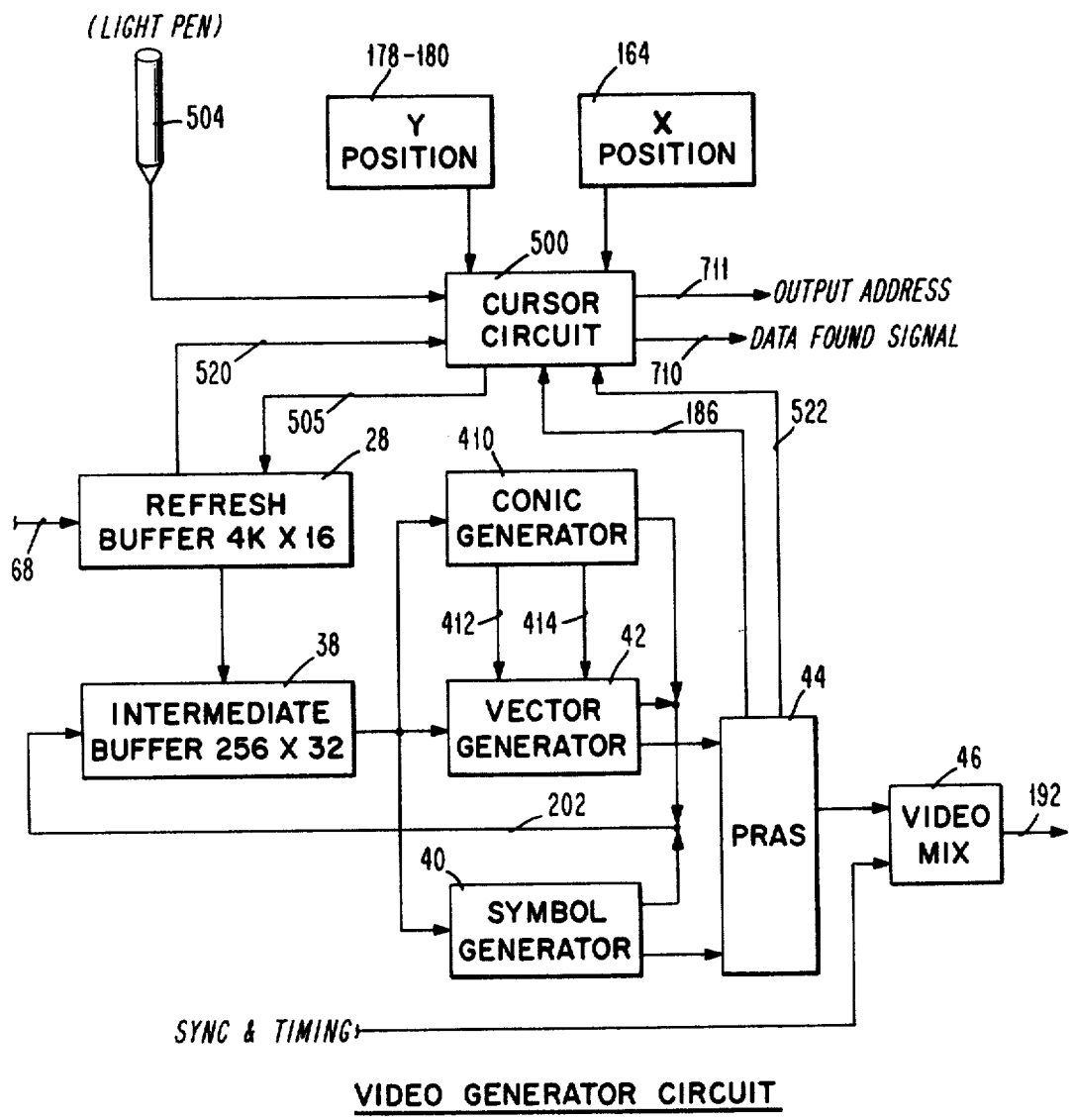
FIG. 1 illustrates the video generator circuit within which the cursor circuit invention finds application.

FIG. 1 illustrates the context within which the cursor invention finds application, namely the video generator circuit disclosed in U.S. Pat. No. 3,996,585 by W. J. Hogan and A. A. Schwartz for a Dynamic Digital Television Display, assigned to the instant assignee.

Dynamic digital TV display operation can be generally described as follows. Digital TV is a display technology which takes coded data from computer sources and converts it to a TV video signal. This signal drives one or more TV monitors which present the desired computer display picture. The logic which converts the coded computer data to a TV signal is all digital, the same as that used in a computer. Thus, digital TV has succeeded in using the technical advances developed in both the TV and computer industries to provide a unique computer display capability.

A TV display in the context used here is one in which one or more electron beams are repeatedly deflected across the face of the Cathode Ray Tube (CRT) in a series of closely spaced parallel lines (called a raster). This is repeated a fixed number of times each second (refresh rate). Within a particular display system the number of parallel lines and the refresh rate are usually fixed. A typical display has 525 lines and is refreshed 30 times per second. Each frame is divided into two fields. One field consists of the odd number scan lines and the other the even scan lines; this results in an interlaced scan which produces an apparent doubling of the refresh rate.

Digital TV presents a computer display in a TV format by reducing the image to a matrix of points or display elements. In a display with horizontal scan lines, the number of vertical display elements is equal to the number of visible scan lines. The number of elements within each scan line is somewhat arbitrary but is typically 1.33 times the number of scan lines. Even though the image is made up of elements, it appears continuous because of the large number of elements used.

The video generator circuit disclosed in the above referenced U.S. Pat. No. 3,996,585 makes use of the new technique of graphic generation known as "on-the-fly" or "implicit refresh" not found in older DTV systems. The on-the-fly technique permits all displayable data to retain its identity in computer coded form up to the final stages of video generation.

In use, implicit refresh allows for erasing data on the display without erasing overlaying (intersecting) data. It permits selective modification of the data. This method of display generation is particularly attractive when blink (flash) and color are desired. The attribute bits for identification of color and flash are contained in computer coded form. In terms of hardware, implicit refresh can reduce the storage requirements in memory by a factor of 18 to 1 for a color graphic display.

Figure 2:
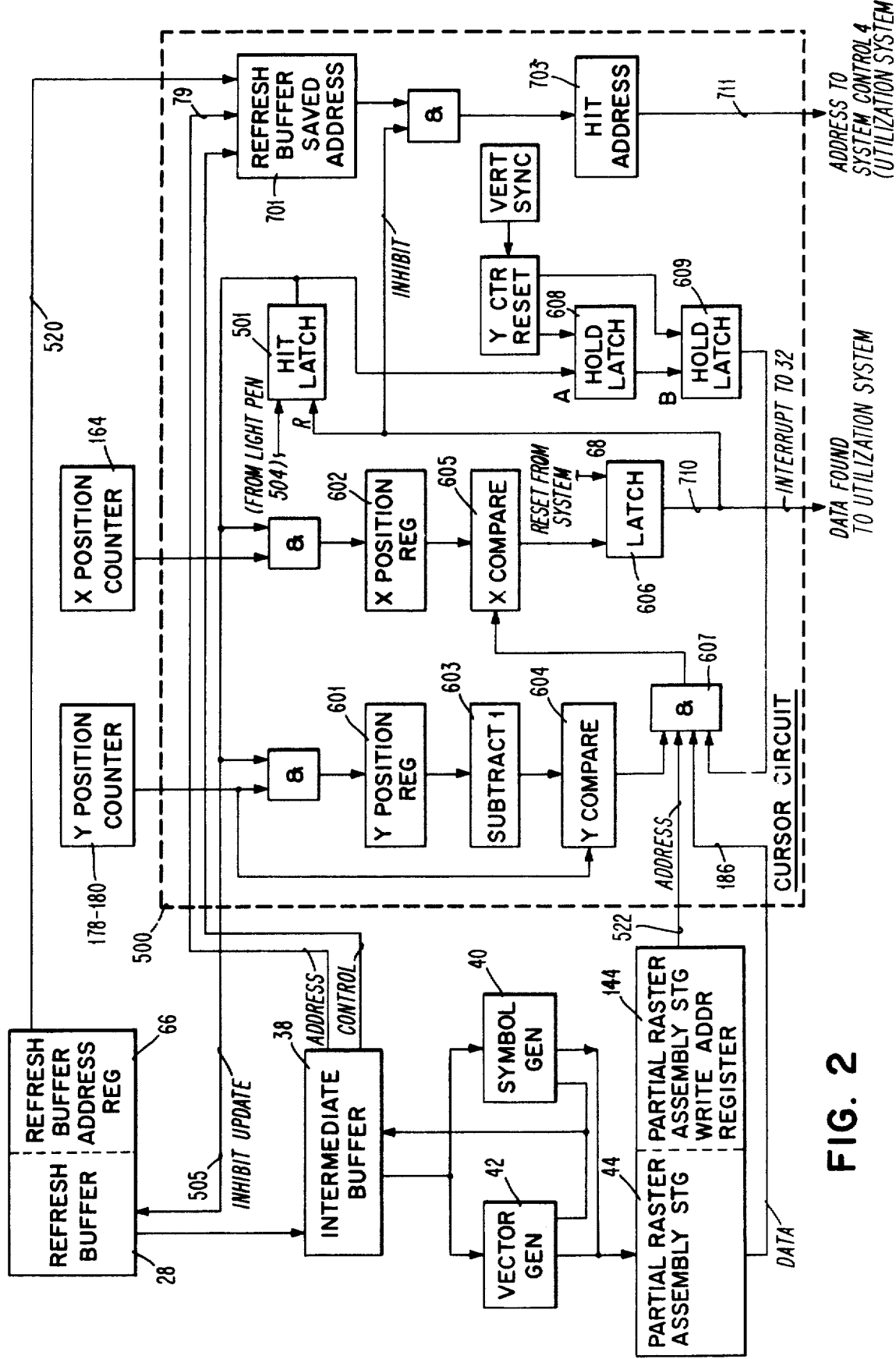
FIG. 2 depicts a detailed diagram of the cursor circuit invention.

The video generator circuit invention shown in FIG. 1, makes use of the "on-the-fly" refresh technique, to dynamically generate a digital television display. The video generator circuit is composed of the refresh buffer 28, the intermediate buffer 38, the vector generator 42, an optional symbol generator 40, and the partial raster assembly store 44. The cursor invention to which the instant disclosure is directed, is shown in FIG. 2, connected to the refresh buffer 28, and partial raster assembly storage 44. The cursor circuit is shown as block 500.

The refresh buffer 28 accepts data signals representing picture elements from a data source such as a computer or programmable controller. The refresh buffer 28 reads the data words out, ordered by Y-address, that is, in the order of their appearance from top to bottom of the display screen, once per field for the vectors, symbol and conic shapes to be displayed, organized as background and dynamic data. The refresh buffer 28 consists of a control module and a storage module providing a total of 4K halfwords, each with 16 data and two parity bits. The major function of the refresh buffer 28 is to store the coded data for constructing the visual display. Data, which is received from the digital computer over line 68 in random fashion, is stored in a form ordered by Y-line. This allows the refresh buffer 28 to be read on a line-by-line basis. A detailed block diagram of the refresh buffer is shown in FIG. 3 of U.S. Pat. No. 3,996,585, referred to above.

The data word input from a utilization system, that is a data processor to the refresh buffer 28 for conic sections, for example, requires six 32-bit words each, with four additional redundant words to facilitate threading of the data by Y-value. A word is included containing the value Y, to facilitate identification of threaded queues in the refresh buffer. Data words are transferred from the digital computer to the refresh buffer 28 on a shared bi-directional halfword bus 68.

The intermediate buffer 38 is a small, high-speed, memory, which receives data in coded form from the refresh buffer 28, and transmits the data, in turn to the conic generator 410, symbol generator 40, or vector generator 42, as required. The intermediate buffer 38 receives from the refresh buffer 28 six 32-bit words for each conic section, for example, starting on a raster line. This data is required by the intermediate buffer 38, as memory space becomes available, prior to the time the raster line is transmitted to the video mixer 46. A detailed block diagram of the intermediate buffer is shown in FIG. 4 of U.S. Pat. No. 3,996,585, referred to above.

Six coded data words are transmitted, at high speed, to the conic generator where, in cooperation with the vector generator 42, they are converted into digital video data. Since a conic section may appear on several raster lines, the conic section generator 410 modifies the coded data words, and then rewrites them into the intermediate buffer 38, for use in generating the digital video data for the next raster line. If the video data conversion has been completed during the generation of the current raster line, that particular set of data words is not rewritten into the intermediate buffer 38.

The intermediate buffer 38 is organized into a pre-load area and an active area, with a total capacity of 256 32-bit words. Data words are transferred from the refresh buffer 28 to the pre-load area as room becomes available, and from the preload area to the active area as required for display.

The vector generator 42 accepts two data words from the intermediate buffer 38 and uses them to determine which elements on each display line comprise the vector. All factors are specified by the host processor as individual vectors starting at the top and running downward on the screen. The vector generator's video dot pattern generating circuitry is used by the conic generator 410, for example, to generate video dot patterns for conic sections to be displayed. A detailed block diagram of the vector generator is shown in FIG. 6 of U.S. Pat. No. 3,996,585, referred to above.

The conic generator invention 410 is shown in U.S. Pat. No. 3,987,284 to Hogan, et al., assigned to the instant assignee. It has an input line 202 to the intermediate buffer 38, and two output lines 412 and 414 to the vector generator 42. The conic generator uses coded data to calculate the starting X coordinate and the delta X length for each of two raster line segments which represent the intersection of the conic section with that raster line. These X and delta X values are output over lines 412 and 414, respectively, to the vector generator 42, for generation of the video dot pattern. The conic generator 410, then modifies the contents of the coded data to represent the intersection of the conic section with the next raster line to be displayed and outputs this modified data over feedback line 202 to the intermediate buffer 38.

The partial raster assembly store 44 (PRAS) is a high-speed memory with capacity for two or three full display raster lines in explicit (noncoded video dot pattern) form. All conic section, vector, and symbol dot pattern data are assembled in one line of the PRAS 44 during the line time preceding its normal display presentation. When the video line is to be displayed, the PRAS line is read out at video rate while the next line is being assembled in the second PRAS line. A detailed block diagram of the PRAS is shown in FIG. 7 of U.S. Pat. No. 3,996,585, referred to above.

The digital video output signal from the PRAS 44 is routed to a video output driver 46, where it is mixed with sync signals, and converted to a composite video signal for transmission over line 192 to the DTV display. One output driver 46 is required for each primary color.

DETAILED DESCRIPTION OF THE CURSOR INVENTION

The DTV system of U.S. Pat. No. 3,996,585, referred to above, is shown in FIG. 1. The Refresh Buffer 28 (RB) holds all the display data in coded form and is read once per TV field. While it must be read out ordered by Y, the ordering function can be transparent to the host processor. The RB readout keeps pace with the display. As data is read it is placed in the Intermediate Buffer 38 (IB) which is read in its entirety on each TV line. As each display item (symbol, vector or conic) is completed, it is purged from the IB. Thus the IB contains only the active, or in process, items. The IB can have room for 128 or 256 items. As each item is read from the IB it goes to either the Symbol Generator 40 (SG), Vector Generator 42 (VG) or conic generator 410. These determine the display elements required for the TV line being processed and cause them to be loaded in the Partial Raster Assembly Store 44 (PRAS). The PRAS contains storage for two or three TV lines. One is read out for display while another is being loaded.

The third, if required, is to permit time to clear the line which has just been read out. Data in the PRAS is in non-coded form. It is on this data that a light pen or cursor select action is taken. The problem which the present invention solves is the relating of the X, Y position resulting from light pen or cursor designation back to data in the RB.

When the data is designated, all that is known is that it resulted from one of the items which were in the IB on the previous line of the field being displayed. This invention provides a means to first identify the item in the IB and then to locate it in the RB.

To identify the item in the IB, the display saves the X, Y values until the next frame and while the TV Line (Y) is being assembled, compares for each video dot loaded into the PRAS, the X address of the dot with the stored X value. This comparison identifies the item in the IB. Extension to area instead of point comparison may be done, if desired, by putting tolerance limits on X and Y.

Reference from IB item to RB item may be accomplished by storing a reference number with each item in the IB. This number can be the address in the RB of the item, in which case once the item is located in the IB, its RB location is immediately known. This method requires enough extra bits in each IB slot to address all RB slots, but it is not dependent on IB or RB organization.

Reference to FIG. 1 will illustrate how the cursor is interconnected with the video generator circuit disclosed in the above referenced U.S. Pat. No. 3,996,585 to Hogan, et al. The cursor circuit 500 has an input connected to the light pen 504 which may be of the type normally found in CRT displays. The cursor circuit 500 has an input connected to the Y position counter 178–180 which is more fully described in FIG. 21A of the U.S. Pat. No. 3,996,585, referred to above. The Y position counter 178–180 will always contain the identifying number of the TV line being displayed. A cursor circuit 500 has an input connected to the X position counter 164 which is more particularly described in FIG. 7 of the U.S. Pat. No. 3,996,585, referred to above. The X position counter 164, extended to 10 bits with two low order bits, will always contain the number of the picture elements being displayed on the TV line. The cursor circuit 500 has an input connected to the refresh buffer address register 66 of the refresh buffer 28, shown to better advantage in FIG. 3 of U.S. Pat. No. 3,996,585, referred to above. Line 520 transmits the addresses of the data which have been transmitted from the refresh butter 28 to the intermediate buffer 38. The cursor circuit 500 has an output line 505 connected to refresh buffer 28 which serves to inhibit the update of the refresh buffer during the period when the identification of the selected display entity is being performed. The cursor circuit also has two inputs from the PRAS 44, the first being line 522 which constitutes the address data in the partial raster assembly storage write address register 144 and the second over line 186 which indicates a "one" input to the PRAS 44. The cursor circuit has an output line 710 connected to the utilization device, which indicates the data sought has been found and output line 711 is the address in the refresh buffer of the data found.

The addresses of data stored in the refresh buffer 28 can be obtained from the address register 66 whenever required. The contents of the X position counter 164 and the Y position counter 178–180 can be interrogated whenever required. The entry of data into the partial raster assembly storage 44 is indicated by a data line 186 so that the coincidence of the address line 522 from the partial raster assembly storage address register 144 and the data line 186 will indicate the writing of a bit to be displayed at a particular address. At the time information is passed from the refresh buffer 28 to the intermediate buffer 38, the signal which clocks the contents of the refresh buffer 28 will also be available to clock the address in the refresh buffer address register 66 into the refresh buffer saved address register 701 of FIG. 2. The same signals which clock the intermediate buffer 38 and cause successive display instructions to be issued to the vector generator 42 and symbol generator 40, are also available for clocking the refresh buffer saved address register 701, from the IB 38 control shown in FIG. 4 of U.S. Pat. No. 3,996,585, referred to above.

The cursor circuit 500 is shown in detail in FIG. 2. There are three principal outputs from the cursor circuit 500. The inhibit update line 505 is used to prevent changes to the refresh buffer 28 during the period when the identification of the selected display entity is being performed. The refresh buffer address line 711 is the address of the identified display entity in the refresh buffer. The data found signal line 710 indicates that the found address on line 711 is available to the utilization system.

A final signal which resets the data designation logic is produced by the utilization system on the line 68 after it has read the hit address on line 711 into the utilization storage.

The hit capture logic can be described as follows, with reference to FIG. 2. The light pen 504 of the type normally found in CRT displays, provides a signal to the hit latch 501, which will set the latch 501 when the illumination of the TV screen activates the light pen 504. The hit latch 501 outputs an inhibit signal on the inhibit update line 505, which prevents further updating of the refresh buffer 28 and which also freezes the present "X" position contents from the counter 164 in the "X" position register 602 and freezes the present "Y" position contents from the counter 178-180 in the "Y" position register 601. Prior to a setting of hit latch 501, the "X" position register 602 and the "Y" position register 601 repeat contents of the "X" position counter 164 and the "Y" position counter 178-180. If the control device for the cursor is a joy stick, track ball, or similar device, the "X" position register 602 and the "Y" position register 601 will be connected to indicate the "X" and "Y" coordinates of the cursor. The "X" position register 602 and the "Y" position register 601 will continue to hold the coordinates of the hit obtained by the light pen 504 or of the cursor position until comparison is complete. Since the display line associated with the "Y" position count was assembled during the display of the preceding raster line, a subtract 1 circuit 603 is interposed between the "Y" position register 601 and the "Y" compare logic 604.

The comparison sequence for the capture logic is described as follows. The hold latch A 608 and the hold latch B 609 form a shift register to produce an output from the hold latch B 609 during the next display of the field on which the hit from the light pen occurred. This shift register is advanced by the reset pulse for the "Y" position counter 178-180, so that it is coincident with the vertical retrace of the display screen. The output of the hold latch B 609 forms the clock pulse for making the "X" coordinate comparison by enabling the gate 607, which produces an output when the following conditions exist.

1. The contents of the "Y" position counter 178-180 are continually compared with the modified contents of the "Y" position register 601 and the "Y" compare circuit 604. During the display of one of the TV lines, there will be identity between the "Y" position counter 178-180 and the "Y" position register 601, as modified by subtract 1 circuit 603.

2. Every time data is written into the partial raster assembly storage 44 for display on the next raster line, the coincidence of data line 186, the "Y" compare condition 604, and the clock from the hold latch B 609 will gate the address from the partial raster assembly storage write address register 144 to the X compare logic 605. The addresses within the partial raster assembly storage have a one-to-one correspondence with the picture element positions on the display screen. Therefore, when there is an identity between the output from the gate 607 and the "X" position register 602, the data element being loaded into the partial rastor assembly storage 44 corresponds to the data element identified by the hit logic. The detection of this correspondence is retained in latch 606.

An alternate mode of operation can be termed the area comparison technique. Modifications may be made to the Y compare circuit 604 and the X compare circuit 605, to permit a data element falling in an area around the position stored in the Y position register 601 and the "X" position register 602, to be selected, instead of requiring the exact coincidence thereof.

The refresh buffer saved address storage 701, has the same organization as, and operates in synchronism with the intermediate buffer 38. It is controlled by the same signals as control the intermediate buffer, with an intermediate buffer address input gating signal on line 79 and IB 38 control signal for purging. The refresh buffer saved address storage 701 functions to receive over line 520 and to retain the addresses of the data which appear in the intermediate buffer 38. Thus at any time, there is a one-to-one correspondence between the data in the intermediate buffer 38 and the addresses in the refresh buffer saved address storage 701. The address which corresponds to the display instruction which is being output by the intermediate buffer 38 is at all times, inserted into the hit address register 703 through the gate 704, so that the hit address register 703 always contains the address in the refresh buffer 28 which is associated with the display instruction being output from the intermediate buffer 38. When the compare latch 606 is turned on by a successful comparison, this changing of the hit address register 703 is inhibited by AND gate 704 so that the hit address register 703 will contain the address in the refresh buffer 28 corresponding to the display entity upon which the hit was made by the light pen 504.

The data found signal 710 indicates to the utilization system that a valid address is available on the hit address output bus 711. The usual procedure is for the utilization system to perform an input operation to transfer the information on the bus 711 to a storage register.

The cursor circuit invention disclosed herein enables the securing of the identity of the encoded symbol in the intermediate buffer during the first display frame and then outputting the identity which contains the refresh buffer address of the coded symbol for access during a second display frame.

While the invention has been particularly shown and described with reference to the preferred embodiments thereof, it will be understood by those skilled in the art that the foregoing and other changes in form and details may be made therein without departing from the spirit and scope of the invention.

We claim:

1. A cursor circuit for a dynamic digital television display device comprising:
   a refresh storage for storing encoded data signals ordered by extremal scan line positions and outputting said encoded data signals in synchronism with a line scan of the display device, to a raster assembly storage for storage for video signals;
   detection means for generating a signal when positioned at a selected point on said display device containing a coded display element to be accessed;
   a coordinate storage means having an input connected to said raster assembly storage and an input connected to said detection means, for storing the "X" and "Y" coordinates of said display element upon receipt of a signal from said detection means; and
   comparison means connected to said coordinate storage means and to said refresh storage, for comparing the "X" coordinate for each coded display element with the "X" coordinate value stored in said coordinate storage means during the loading of said video signals in said raster assembly storage for the raster line having a "Y" coordinate equal to the value stored in said coordinate storage means, to identify the coded display element to be accessed in said refresh storage;
   said refresh storage including a refresh buffer having an output, connected to receive randomly occurring data signals and sort those signals into groups of ordered data signals ordered by extremal line scan position and also including an intermediate buffer having a first input connected to the output of said refresh buffer for storing said ordered data signals once during each display field and outputting said ordered data signals in synchronism with the line scan of the display device;
   said coded display element to be accessed being identified in the intermediate buffer;
   whereby the coded display element to be accessed is identified in said refresh storage.

2. The circuit of claim 1, which further comprises: said detection means being a light pen.

3. The circuit of claim 1, which further comprises:
   said raster assembly storage including a display element generator means connected to the output of said intermediate buffer for decoding said ordered data signals outputted from said intermediate buffer and generating on a first output line components of a display element which lie along the display line to be scanned and further including a partial raster assembly storage connected to said first output line from said display element generator means to store the components of the display element which lie along the display line to be scanned;
   said partial raster assembly storage providing the value of the "X" coordinate of each coded display element whose video signal is stored therein, to said comparison means.

4. The circuit of claim 3, which further comprises:
   said coded display elements represented by a code containing the address bits of the coded element in said refresh buffer; and
   means for outputting said address bits to a utilization device to enable the accessing of said coded display elements from said refresh buffer.

5. A coded digital TV system comprising:
   an ordered refresh buffer having an input connected to receive randomly occurring data signals and sort those signals into groups of ordered data signals ordered by extremal scan line positions and an output;
   an intermediate buffer having a first input connected to the output of said refresh buffer for storing said ordered data signals once during each display field and outputting said ordered data signals in synchronism with the line scan displayed and an output;
   a display element generator means connected to the output of said intermediate buffer for decoding said ordered data signals outputted for said intermediate buffer and generating on a first output line components of a display element which lie along the display line to be scanned;
   a partial raster assembly storage having an input connected to said first output line from said display element generator means to store the components of the display element which lie along the display line to be scanned and an output;
   a display means connecting to the output of said partial raster assembly storage;
   a light pen means for generating a signal when positioned at a selected point on said display means containing a coded element to be accessed, during a first display frame interval;
   a coordinate storage means having an input connected to said display element generator means and an input connected to said light pen means, for storing the "X" and "Y" coordinates of said coded element upon receipt of light pen signals; and
   means for comparing the "X" coordinate of each coded element with the "X" coordinate value stored in said coordinate storage means during the loading of the video data in said partial raster assembly storage for the raster line having a "Y" coordinate equal to the value stored in said coordinate storage means, to identify the coded element to be accessed in said intermediate buffer;
   whereby the coded element to be accessed is identified in the intermediate buffer.

6. The system of claim 5 which further comprises:
   said coded display element represented by a code containing address bits of the coded element in said refresh buffer; and
   means for outputting said address bits to a utilization device to enable accessing said coded display element from said refresh buffer.

* * * * *